United States Patent [19]
Aoki et al.

[11] Patent Number: 5,151,390
[45] Date of Patent: Sep. 29, 1992

[54] SILICON NITRIDE-BASED FIBERS AND COMPOSITE MATERIAL REINFORCED WITH FIBERS

[75] Inventors: Hiroyuki Aoki; Tadashi Suzuki; Toshio Katahata; Mutsuo Haino; Genshiro Nishimura; Hiroshi Kaya; Kozaburo Tamura; Takeshi Isoda, all of Saitama, Japan

[73] Assignee: Toa Nenryo Kogyo Kabushiki Kaisha, Tokyo, Japan

[21] Appl. No.: 732,997

[22] Filed: Jul. 18, 1991

Related U.S. Application Data

[63] Continuation of Ser. No. 319,418, Mar. 3, 1989, abandoned, which is a continuation-in-part of Ser. No. 253,916, Oct. 4, 1988, Pat. No. 4,833,107, which is a continuation of Ser. No. 48,054, May 11, 1987, abandoned.

[30] Foreign Application Priority Data

Jun. 13, 1986 [JP] Japan ................................. 61-136242
Mar. 5, 1988 [JP] Japan ................................. 63-52461

[51] Int. Cl.⁵ ............................................. C04B 35/58
[52] U.S. Cl. ......................................... 501/95; 501/92; 501/97; 264/DIG. 19
[58] Field of Search ............................ 501/92, 95, 97; 264/DIG. 19

[56] References Cited

U.S. PATENT DOCUMENTS 4,397,828  8/1983  Seyferth et al. ...................... 501/97
4,650,773  3/1987  Okamura et al. ..................... 501/95

FOREIGN PATENT DOCUMENTS 49-20206   2/1974   Japan .
49-69717   7/1974   Japan .
57-200210  12/1982  Japan .
60-145903  8/1985   Japan .
62-195024  8/1987   Japan .
1138107    5/1989   Japan .

OTHER PUBLICATIONS

Cunningham et al., 15th Nat. SAMPE symp., 1969.
Penn et al., "J. of Applied Polymer Science" vol. 27, 3751-3761 (1982).
Penn et al., I.E.C., "Proc. Des, Dev." vol. 23, No. 2, 217-220 (1984).
W. M. Scantlin, Inorganic Chemistry, 11 (1972).
A. Stock Ber. 54, p. 740 (1921).
"Jikken Kagaku Kohza (Experimental Chemistry Lectures) 4" Maruzen, K. K. pp. 269-298.

Primary Examiner—Mark L. Bell
Assistant Examiner—Anthony J. Green
Attorney, Agent, or Firm—Michael N. Meller

[57] ABSTRACT

Inorganic fibers having a high strength and a high modulus of elasticity at a high temperature are provided. The inorganic fibers are amorphous inorganic silicon nitirde-based fibers composed of silicon and nitrogen, optionally with oxygen, carbon and hydrogen, and having atomic ratio between above respective elements of N/Si=0.3 to 3, O/Si=up to 15, C/Si=up to 7 and H/Si=up to 15, wherein ratios of X-ray scattering intensity thereof to that of air at 1° and 0.5° are from 1 to 20 respectively and the silicon nitride-based fiber is still amorphous after heating in an inactive atmosphere at 1200° C. for 1 hour. Composites of a metal, a ceramics, and a high molecular weight organic compound reinforced with the above fibers are also provided.

9 Claims, No Drawings

SILICON NITRIDE-BASED FIBERS AND COMPOSITE MATERIAL REINFORCED WITH FIBERS

This is a continuation of application Ser. No. 319,418, filed Mar. 3, 1989 abandoned which is a continuation-in-part of Ser. No. 253,916, filed Oct. 4, 1988 (U.S. Pat. No. 4,833,107 which is a continuation of Ser. No. 048,054, filed May 11, 1987, abandoned.

BACKGROUND OF THE INVENTION

1. Field of the Invention

The present invention relates to an inorganic silicon nitride-based fiber and a composite material reinforced by the fiber. The inorganic silicon nitride-based fiber of the present invention has a higher strength and a higher modulus of elasticity than known silicon nitride-based fibers and a high adhesion with various matrixes including metals, organic resins and rubbers, and ceramics, thereby providing a composite material having a high strength, a high modulus of elasticity and a high heat resistance.

2. Description of the Related Art

The silicon nitride has excellent properties including mechanical strength, thermalshock resistance, oxidation resistance, chemical resistance, wettability with metals, and electrical insulation, and is now widely used as industrial heat resistant materials and abrasion resistant materials. Generally, ceramic materials are known to have remarkably increased properties including mechanical strengths when formed into fibers. Therefore, silicon nitride formed into fibers may have the above various advantageous properties and may be expected to be used as heat resistant materials in mesh belts, conveyer belts, curtain, filters etc., and as reinforcements in composite materials such as engine parts, fan blades, aircraft structures etc., by being processed into various forms including woven fabrics, felts, ropes, yarns, and chopped strands.

Various processes have been proposed for the production of silicon nitride fibers. Some of the more important processes are listed below:

(1) a process, wherein silicon monoxide (SiO) prepared by reducing silicate at a high temperature is reacted with ammonia and hydrogen at 1425° to 1455° C. to form fibrous silicon nitride, 5 to 30 μm in diameter and about 370 mm long, on a graphite substrate. (Cunningham et al., 15th Nat. SAMPE Symp., 1969), (2) a process, wherein an organic polycondensate having one or more silazane (SiN) groups is melt-spun to form a fibrous polymer, which is fired in an ammonia atmosphere (Ishikawa et al., Japanese Patent Laid-Open No. 200210/1982), and (3) a process, wherein organosilazane fibers prepared by melt spinning or dry spinning organosilazanes are fired in an inert gas atmosphere to produce silicon carbide/silicon nitride composite fibers (G. Winter et al., Japanese Patent Laid-Open No. 69717/1974; W. Verbeek et al., Japanese Patent Laid-Open No. 20206/1974; Penn et al., "J. of Applied Polymer Science", Vol. 27, 3751-3761 (1982); Penn et al., I.E.C., "Proc. Des. Dev.", Vol. 23, No. 2, 217-220 (1984); Seyferth et al., U.S. Pat. No. 4,482,669).

Each of the above processes and silicon nitride fibers produced thereby have specific problems. The process (1) is incapable of making silicon nitride into continuous fibers, and is not suited for mass production because of its poor controllability. The major problems associated with the processes (2) and (3) result from higher carbon contents in their starting fibers, with the result that the final products will have higher concentrations of silicon carbide and/or free carbon. This may sometimes cause formation of cracks, voids and pores during the thermal decomposition step, which will degrade some of the properties inherent in silicon nitride, such as electrical insulation, mechanical strength and resistance to thermal shocks. Furtheremore, the fibers prepared by the processes (2) and (3) are insufficient in tensile strength and electrical resistivity, which are known in the art to have to be in the order of 41 to 142 kg/mm$^2$ and 7 $\times 10^8$ Ω·cm, to be used for aerospace materials.

Composite materials using fibers as a reinforcement are known. For example, metals are reinforced with inorganic fibers such as silica fibers, alumina fibers, or carbon fibers. But silica fiber reinforced metals have a low modulus of elasticity and an insufficiently high strength; alumina fibers do not sufficiently increase in strength and modulus of elasticity etc. due to a low compatibility or wettability with metals; and carbon fibers have a large reactivity with metals, resulting in a lower strength of metals. Metals reinforced with silicon carbide fibers are also known, but the strength of silicon carbide fibers is lowered when immersed in molten metals and when heated after reinforcement due to a reaction with the metals. Furthermore, a conventional reinforcement of metals with inorganic fibers generally requires a surface treatment of the fibers to prevent a lowering of the strength thereof as well as a prolonged heat treatment, which are disadvantageous.

Composite materials of ceramics reinforced with silica fibers, alumina fibers or silicon carbide fibers are also known. The production cost for these fibers is very high, and the silica fibers have a low modulus of elasticity and the alumina fibers have a low thermal shock resistance. The silicon carbide fibers provide an excellent thermal resistance to metals, but it is difficult to obtain uniform silicon carbide fibers, resulting in nonuniform properties of the composite material. Moreover, the cost of silicon carbide fibers is high.

Resine or rubbers are reinforced with whiskers, glass fibers, alamide fibers, alumina fibers, silicon carbide fibers, etc. Whiskers are difficult to arrange in required directions in resins, etc., due to their nonuniform length and diameter, resulting in low strength of the composite materials. Glass fibers, which are most widely used at present, have a low strength and low modulus of elasticity and do not provide higher strength composite materials. Carbon fibers do not have a good wettability with resins and rubbers and are electrically conductive, which limits the application thereof. Alamide fibers have a reduced stiffness and reduced antioxydation in comparison with inorganic fibers. Alumina fibers have a high density and a low strength, although electrically insulative and electromagnetic wave transmissive and having a high modulus of elasticity. Silicon carbide fibers are not suitable for various uses due to the very high electrical insulation, etc., thereof.

SUMMARY OF THE INVENTION

According to the present invention, there is provided an amorphous inorganic silicon nitride-based fiber composed of silicon and nitrogen, optionally with oxygen, carbon and hydrogen, and having atom mole ratios between above respective elements of N/Si=0.3 to 3, O/si=up to 15, C/Si=up to 7 and H/Si=up to 15, wherein ratio of X-ray scattering intensity thereof to that of air at 1° and 0.5° are from 1 to 20 respectively and the silicon nitride-base fiber is still amorphous after heating in an inactive atmosphere at 1200° C. for 1 hour.

There is also provided, according to the present invention, a composite material of a matrix reinforced with an amorphous inorganic silicon nitride-based fiber as described above. The matrix may comprise a metal, a ceramic or an organic high molecular weight compound such as a resin or a rubber.

DESCRIPTION OF THE PREFERRED EMBODIMENTS

The inventors found that the particular inorganic silicon nitride-based fiber as stated above has an excellent compatibility and adhesivity with metals, ceramics and an organic high molecular weight compound, etc., and an excellent electrical insulation, and as a result, a composite material reinforced with such a fiber has excellent mechanical properties such as shearing strength and shock resistance, and an excellent electrical insulation.

The inorganic silicon nitride-based fiber of the present invention comprises silicon and nitrogen as essential elements and oxygen, carbon and hydrogen as optional elements. When oxygen or carbon is contained, the wettability of the fiber with a matrix of a composite material is improved, and particularly, oxygen contributes to an increase of the elongation. The effective contents of these elements are shown below. If the respective content of each element exceeds the limitation, spinning is impossible or fibers having undesirable properties are obtained.

The fiber of the present invention is amorphous, and particularly, the fiber remains amorphous even when heated in an inactive atmosphere at about 1200° C. for 1 hour. The amorphous fiber of the present invention preferably contains microcrystals formed at a temperature higher than 1200° C. The microcrystalline phase is classified in the amorphous phase, not the crystalline phase. The above amorphous fiber has less micropores in the fiber, and therefore, exhibits a particular X-ray small angle scattering intensity ratio, as described below. Namely, fibers that do not substantially exhibit diffraction or reflection due to crystals of silicon nitride, silicon oxynitride, silicon oxide, silicon carbide, silicon, etc., are preferable for the purpose of the present invention.

The more preferable structure of the fiber is an amorphous structure containing microcrystals. The microcrystals have crystalite sizes of up to 2000 Å, preferably up to 1000 Å, more preferably from 500 Å to 50 Å, in every direction, measured by the X-ray diffraction half maximum value width method (JONES method).

The atom mole ratios between the elements composing the inorganic fiber of the present invention are:

| N/Si | 0.3-3 |
|---|---|
| O/Si | up to 15 |
| C/Si | up to 7 |
| N/Si | up to 15 | preferably

| | preferably |
|---|---|
| N/Si | 0.6-1.4 |
| O/Si | up to 10 |
| C/Si | up to 3.5 |
| H/Si | up to 5 | more preferably

| | more preferably |
|---|---|
| N/Si | 1-1.3 |
| O/Si | up to 4 |
| C/Si | up to 3.5 |
| H/Si | up to 1 |

If the ratios of the elements are not within the above ratios, the fiber cannot exhibit a sufficient tensile strength, modulus of elasticity, and heat resistance etc., for reinforcement of a composite material.

According to experiments by the inventors, it was found that amorphous inorganic silicon nitride-based fiber having a particular X-ray scattering intensity is extremely effective for the purposes of the present invention.

The necessary property for a fiber reinforcement in a composite material is an X-ray small angle scattering intensity at 1° and 0.5° that is 1 to 20 times larger than the corresponding scattering intensities of air, with preferably 1 to 10 times, more preferably 1 to 5 times.

The X-ray small angle scattering intensity is used to detect the presence of micropores, i.e., voids in the inorganic fiber, and the small angle scattering is observed by an uneven distribution of electron density in the system if micropores are present in the fiber.

In the Guinier theory of the small angle scattering, the scattering intensity is represented by the following formula:

$$I(h) = (\Delta\rho)^2 V^2 exp(-h^2 Rg^2/3)$$

Where I(h) is scattering intensity at a vector quantity h in the inverse space;

$\Delta\rho$ is a difference of electron density between the scattering void and the surrounding material;

Rg is an inertia radius

V is a volume of a mass to scatter;

$$h \text{ is } \frac{4\pi \sin \theta}{\lambda}$$

$\lambda$ is an X-ray wavelength; and $\theta$ is a scattering angne.

Therefore, since the scattering angle intensity I(h) at a certain scattering angle is proportional to the volume of the void having the inertia radius Rg, the scattering intensity I(h) can be used as a measure of the amount of the voids in the fibers, by correction with the density.

The measurement of the small angle scattering intensity is generally conducted by methods described in "Zikken Kagaku Kohza 4; KotaiButsurigaku (Lecture of Experimental Chemistry 4, Physics of Solids)", edited by Nippon Kagakukai (Chemical Society of Japan), 1956. The small angle scattering angle of the inorganic fiber of the present invention may be measured by the following method:

an X-ray analyzer RJ-200B type, manufactured by Rigaku Denki K. K. is provided with a location detecting proportional counter PSPC-5. The tube voltage is 45 kV and the Tube current is 95 mA, and the first and second slits have diameters of 0.2 mmϕ and 0.15 mmϕ respectively. The scattering intensity is determined by integrating at each 0.02° for 1000 seconds. The sample is prepared by adhering 18 mg of fibers having a length of 15 mm uniformly in a slit having a length of 10 mm and a width of 4 mm.

The scattering intensity ratio of [±(a silicon nitride-based fiber)/I(air)] is calculated by comparing the scattering intensities of the silicon nitride-based fibers with those of air, at 1° and 0.5°.

The inorganic silicon nitride-based fiber of the present invention is amorphous and remains in the amorphous state even if heated in an inert atmosphere, for example, nitrogen gas, at 1200° C. for 1 hour. "Being amorphous at 1200° C." is an item of quality required for a practical heat resistance material, but this has not achieved by conventional silicon nitride-based fibers. Further, the strength of the amorphous fiber is preferably improved by containing microcrystals in the amorphous fiber. Preferably, such microcrystals are formed at a temperature higher than 1200° C. or higher than 1300° C.

The amorphous inorganic silicon nitride-based fiber having the above features of the present invention preferably has the following properties.

|  | Preferably | More Preferably |
|---|---|---|
| Tensile strength [kg/mm²] | 100–450 | 200–450 |
| Modulus of elasticity [ton/mm²] | 10–90 | 20–90 |
| Diameter [μm] | 3–30 | 3–20 |

The inorganic silicon nitride-based fiber of the present invention may be produced by spinning polysilazane having a repeating unit represented by the general formula:

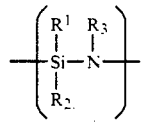

and having a number average molecular weight of 200 to 500,000, followed by firing or heat treating the spun fiber.

$R^1$, $R^2$ and $R^3$ in the above formula may be the same or different and are a substituting group or a skelton composed of nitrogen, oxygen, carbon, silicon and hydrogen atoms, for example, a hydrogen atom or a hydrocarbon group.

The hydrocarbon group includes an alkyl group, alkenyl group, cycloalkyl group, and aryl group, etc. The alkyl group includes methyl, ethyl, propyl, butyl, pentyl, hexyl, heptyl, octyl, and decyl, etc; the alkenyl group includes vinyl, allyl, butenyl, pentanyl, hexcenyl, heptinyl, octenyl, and decenyl, etc.; and the acryl group includes phenyl, toryl, xylyl, and naphtyl, etc.

Preferable polysilazanes used include inorganic polysilazanes having a repeating unit represented by the general formula:

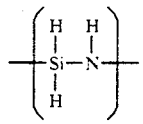

and having a number average molecular weight of 100 to 50,000, wherein the polysilazane may be a cyclic or linear composed or a combination thereof.

From these polyperhydrosilazanes as the starting material, an inorganic silicon nitride-based fiber composed of silicon and introgen as the essential elements and hydrogen as the optional element may be produced.

The above polyperhydrosilazanes may be produced, for example, by reacting a holosilane, e.g., dichlorosilane, with a base such as pyridine to produce an adduct of the holosilane and the base, followed by reacting the adduct with ammonia (Japanese Unexamined Patent Publication (Kokai) No. 60-145903).

To obtain higher performances as reinforcing fibers, highly polymerized silizane polymers proposed by the inventors are preferred. The highly polymerized silazane polymers are prepared by heating a solution of the above polyperhydrosilazane, or silazane polymers disclosed in A. Stock. Ber, 54, p 740 (1921), W. M. Scantlin, Inorganic Chemistry, 11 (1972), A. Sey Ferth, or U.S. Pat. No. 4,397,828, in a solvent of basic compounds such as tertiary amine (e.g., tialkylamine), secondary amine having a steric hinderance group, or phosphine, or in a nonbasic solvent such as hydrocarbons at from $-78°$ C. to 300° C. to obtain polymers having a number average molecular weight of 200 to 500,000, more preferably 500 to 10,000, by dehydration condensation.

Also preferable are polisilazanes, proposed by the inventors, which are produced by a modification of polysilazanes to have a cross linkage $(NH)_n$ where n is a number of 1 or 2, so that a molar ratio silicon-banded nitrogen to silicon (N/Si) is increased to 0.8 or more, and to have a number average molecular weight of 200 to 500,000, more preferably 500 to 10,000. The modification is conducted by a dehydration condensation of polysilazanes with ammonia or hydradize (Japanese Patent Application No. 62-202767) corresponding to Japanese Unexamined Publication (Kokai) No. 1-138107). This modification is particularly effective in controlling the nitrogen to silicon molar ratio to improve properties of the fiber obtained from the modified polysilazanes.

Polysiloxazanes having repeating units of $(SiH_2NH)$ and $(SiH_2O)$ and a polymerization degree of 5 to 300, more preferably 5 to 100 (Japanese Unexamined Patent Publication (Kokai) No. 62-195024) also may be preferably used the starting material. From these polysiloxazanes, inorganic silicon nitrogen-based fibers composed of silicon, nitrogen and oxygen as the essential elements and hydrogen as an optional element can be prepared.

Similarly, from polyorganohydrosilazanes having a rational formula $(RSiHNH)_x[(RSiH)_{1.5}N]_{l-x}$ where R is alkyl, alkenyl, cycloalkyl, aryl, aralkyl, or other groups in which carbon atom is bonded directly to silicon atom, or alkylsilyl, alkylamino group, or alkoxyl and $0.4 < x < 1$ (Japanese Unexamined Patent Publication (Kokai) No. 62-156135), inorganic silicon nitride-based fibers composed of silicon, nitrogen and carbon, or silicon, nitrogen, carbon and oxygen as the essential elements and hydrogen and oxygen or hydrogen as optional element(s) can be prepared.

Various polysilazanes as above are prepared as a spinning solution, followed by spinning and heat treating, to obtain an inorganic silicon nitride-based fiber of the present invention. These procedures are later described more specifically.

The solvent used for the spinning solution is not reactive with the polysilazane. Such an inactive solvent includes hydrocarbon, halogenated hydrocarbon, ether, and sulfur compound, etc. Preferable solvents include hydrocarbons such as pentane, hexane, isohexane, methylpentane, heptane, isoheptane, octane, isooctane, cyclopentane, methylcyclopentane, cyclohexane, methylcyclohexane, benzen, toluen, xylene, and ethylbenzene; halogenated hydrocarbons such as methylene chloride, chloroform, carbon tetrachloride, bromoform, ethylene chloride, ethylidene chloride, trichloroethane, tetrachloroethane, and chlorobenzene; ethers such as ethyl ether, propyl ether, ethyl butyl ether, butyl ether, 1,2-dioxy ethane, dioxane, dimethyloxane, tetrahydrofuran, tetrahydropyran and anisole; and sulfur compounds such as carbon disulfide, diethyl sulfide, thiophene and tetrahydrothiophene.

The spinning solution comprising the polysilazane exhibits a sufficient spinnability for dry spinning by itself, but preferably is added with a very small amount of an organic high molecular weight compound in certain cases. The concentration of the polysilazane in the spinning solution depends on the average molecular weight, molecular weight distribution and molecular structure of the polysilazane used, but is usually preferably from 50% to 98% by weight. The concentration of the polysilazane in the spinning solution can be controlled, for example, by condensation of the solution or dissolving dried polysilazane into the solution.

The spinning solution is pretreated by degrassig and filtering, etc. before spinning, to remove materials such as gel and contamination in the solution which may disturb the spinning. The spinning is advantageously conducted by dry spinning, but centrifugal spinning or blow spinning etc. may be employed. In the dry spinning, the spinning solution is spouted through a nozzle into spinning cylinder to form fibers, which are would up to obtain continuous fibers. The diameter of the nozzle, the spouting speed and the winding-up speed, although differing for the desired fiber diameter and the properties of the spinning solution used, are generally as follows. Diameter of the nozzle: 0.035 mm to 0.5 mm, preferably 0.05 mm to 0.3 mm. Spouting speed: 300 m/min to 5000 m/min, preferably 600 m/min to 2500 m/min. Winding-up speed: 300 m/min to 5000 m/min, preferably 60 m/min to 2500 m/min. The atmosphere in the spinning cylinder is not particularly limited and may be atmospheric air, but an atmosphere of at least one gas of dry air, ammonia and an inert gas or atmosphere containing water steam or nonreactive solvent, as mentioned before, is advantageous since the stabilization of fibers or solidification of fibers can be controlled by the drying in the cylinder. Moreover, heating the atmosphere or the spinning cylinder is also advantageous since it allows a desirable control of the solidication of fibers in the cylinder. The temperature of the spinning solution is usually 20° C. to 300° C., preferably 30° C. to 200° C. and the temperature of the atmosphere in the spinning cylinder is preferably 20° C. to 300° C., preferably 40° C. to 250° C.

Since the fibers wound-up by dry spinning may contain the solvent, these fibers, if necessary, are dried under atmospheric pressure or under vacuum in an atmosphere selected from dry air, ammonia and an inert gas. The drying may be advantageously accompanied by heating to accelerate drying of the fibers. A heating temperature of 20° C. to 500° C. is usually advantageous. During the drying, providing the fibers with tension may prevent warping, twisting and bending of the fibers when solidified. Normal by the tension is from 1 g/mm$^2$ to 50 kg/mm$^2$.

The thus obtained polysilazane fibers are white in color, and have a sufficiently high strength even before being heat treated or fired that the process may be modified in such a way that the spinned fibers are processed into yarns or woven fabrics before heat treatment.

The above process for producing polysilazane fibers is suitable for obtaining high-purity, continuous polysilazane fibers. Moreover, this process can be employed for the production of not only continuous fibers but also short fibers. The short fibers can be obtained by cutting the fired, continuous silicon nitride-based fibers; by cutting the precursors, comprising the continuous fibers of polysilazanes, into short fibers and firing them to produce short silicon nitride-based fibers; or by directly forming precursor polysilazane in the form of short fibers and the firing them to produce short silicon nitride-based fibers.

The prepared polysilazane fibers can be heat treated or fired directly, i.e., without additional curing to form inorganic silicon nitride-based fibers, since they are stabilized to or infusible by heat. The heat treatment is preferably conducted under vacuum, or in a gas atmosphere of nitrogen, an inert gas such as argon, ammonia, hydrogen, or a mixture thereof. The heat treatment temperature is usually from 500° C. to 1800° C., preferably 700° C. to 1600° C., for a time of 5 minutes to 10 hours. The crystallization of fibers usually involves partial shrinkage of the distance between the constituent atoms and therefore causes formation of voids in the fibers. By controlling the temperature of firing or heat treatment to generally 500° C. to 1800° C., preferably 700° C. to 1600° C., the X ray small angle scattering intensity ratio can be reduced. Since volatile components in the fibers are almost vaporized at a temperature usually in a range of 300° C to 600° C., the formation of voids due to partial evaporation and partial shrinkage can be prevented by controlling the heating rate of the heat treatment at the above temperature range, i.e., 300° C. to 600° C., to usually 0.1° C./min to 100° C./min, preferably 0.1° C./min to 20° C./min, whereby the X ray small angle scattering intensity ratio can be decreased. By controlling the heat treatment temperature to below 1800° C. and adjusting the temperature elevation rate, the X-ray small angle scattering intensity ratio of the resultant inorganic fibers can be controlled.

Pretreatment of the polysilazane fibers with ammonia, namely an ammonia treatment up to 400 to 600° C. followed by treatment in an inert atmosphere, particularly in nitrogen up to 1200° C. to 1300° C., advantageously prevents crystallization of the fibers to provide amorphous fibers of the present invention that remain amorphous even when heated at 1200° C. for 1 hour.

Pretreatment of polysilazane fibers with ammonia or in other reducing atmospheres, for example in hydrazine, hydrogen also effectively reduces the carbon content of the fiber. The pressure is not limited, but atmospheric pressure is preferred from the viewpoint of simplifying the operation. The most adequate temperature of the heat treatment depends on the time for which the treatment is carried out, but generally the temperature in a range of 400° to 1600° C. is preferable. If the temperature is lower than 400° C., there is little cleavage of the C—Si or C—N bond, and if the temperature is higher than 1600° C., silicon carbide is preferentially formed since the C—Si bond is more stable than the C-N bond at that temperature. The most adequate time for the heat treatment depends on the diameter of the fiber and the heat treatment temperature, but generally more than six minutes is preferable.

During the heat treatment, the fibers are caused to shrink and form twists or bends, since almost all volatile components contained in the fibers are vaporized at 300° C. to 600° C. This can be prevented by applying a tension to the fiber during the heat treatment; normally the tension applied is 1 g/mm$^2$ to 50 kg/mm$^2$.

The fiber thus obtained is preferably used in the form of (1) fibers aligned in one or multiple directions, (2) hand woven fabric, statin woven fabric, twill fabric, imitation leno, figured fabric, or three or more dimensional fabric made from the above, or (3) chopped fibers, to exhibit the preferable properties thereof.

According to the present invention, there is also provided a novel composite material using an amorphous inorganic silicon nitride-based fiber as described above. The composite material may comprise a matrix of a metal, a ceramic, and an organic high molecular weight compound, etc.

The metal used as a matrix in a composite material of the present invention may be any metal or alloy conventionally used in similar composite materials and includes, for example, copper, silver, zinc, magnesium, aluminium, titanium, tin, germanium, silicon, lead, iron, cobalt, nickel, zirconium, indium, etc., and alloys of any of these metals. The metals preferably used in the present invention are copper, magnesium, aluminium, titanium, iron, cobalt, nickel, etc.

The composite material may contain, in a metal matrix, additional inorganic fibers selected according to the purpose or usage of the composite material. Such inorganic fibers include glass fiber, carbon fiber, boron fiber, silicon carbide fiber, alumina fiber, silica-alumina fiber, boron nitride fiber, boron carbide fiber, silicon carbide-titanium carbide fiber, etc.

The amount of the inorganic fiber used depends on the form of the fiber, for example, aligned fibers or woven fabric, or the kind of the metal used, but usually is from 10 to 90% by volume, more preferably 25% to 70% by volume based on the total volume of the composite material To improve the wettability between the inorganic fiber and the matrix of a metal, the inorganic fiber may be coated with the matrix metal or another metal. The coating may be carried out by any known method, for example, chemical vapor deposition, sputtering, evaporation, electrical plating, powder fusing, electroless plating, flame spraying, etc.

The composite material comprising a metal matrix reinforced with an inorganic fiber, of the present invention, may be produced, for example, by (1) diffusion bonding, (2) liquid impregnation, (3) flame spraying, (4) electrochemical deposition, (5) extrusion and hot rolling, (6) chemical vapor deposition, or (7) sintering. These methods are described below.

(1) Diffusion Bonding: Inorganic fibers and wires of a matrix metal are alternately arranged in one direction, both sides of which are covered with a film of the matrix metal, or only the lower side of which is covered with a film of the matrix metal and the upper side of which is covered with powders of the matrix metal mixed with an organic binder. A plurality of the layers are laminated and pressed while heating to form a composite material of the inorganic fibers and the matrix metal. The organic binder is preferably vaporized and removed before the temperature is elevated to a level at which the binder forms a carbide with the matrix metal. Such an organic binder may be, for example, CMC (carboxymethyl cellulose), paraphine, resin, mineral oils, etc.

Alternatively, the inorganic fibers coated with a mixture of an organic binder and powders of the matrix metal are arranged and then laminated. The laminate is pressed while heating to form a composite material.

(2) Liquid permeation: Fused aluminum, aluminum alloy, magnesium, magnesium alloy, titanium, or titanium alloy is filled in the gaps between aligned inorganic fibers to form a composite material. In this case, the gaps between the aligned inorganic fibers are uniformly filled because of a good wettability of metal-coated fibers with a matrix metal.

(3) Flame spraying: A matrix metal is coated on aligned inorganic fibers by plasma or gas spraying to form a composite material in the form of a tape. The tape can be used as is, or may be laminated and processed by the above diffusion bonding method.

(4) Electrochemical Deposition: A matrix metal is electrochemically deposited onto the surfaces of inorganic fibers to form composites which are aligned and laminated, followed by the above diffusion bonding process.

(5) Extrusion and hot melting: Inorganic fibers are aligned in one direction and sandwiched by foils of a matrix metal, which is passed through a roll, if necessary while heating, to bind the inorganic fibers and the matrix metal.

(6) Chemical vapor deposition: A matrix metal is deposited on the surfaces of inorganic fibers by CVD. For example, inorganic fibers are charged in a furnace into which a gas mixture of aluminum chloride and hydrogen is introduced and thermally decomposed to deposit aluminum metal onto the surfaces of the fibers. The metal coated fibers are arranged and laminated and processed by the above diffusion bonding.

(7) Sintering: Gaps between aligned inorganic fibers are filled with matrix metal powders and heated or sintered under pressure or without pressure to form a composite material.

In another embodiment of the present invention, the matrix of the composite material may comprise a ceramic.

The ceramics used as a matrix may be any known ceramics used in fiber-reinforced ceramic composite materials, but carbides and nitrides are preferable to provide heat resistant materials having a high strength, high modulus of elasticity, high chemical resistance, high thermal shock resistance, etc. at a high temperature, which is the object of the present invention. Note, more generally, other ceramics such as oxides, silicates, borates, etc. may be used as a matrix.

As in the metal composite material, other inorganic fibers such as glass fibers, carbon fibers, etc. may be used together with the inorganic fibers of the present invention. The content of the fibers is preferably from 10% to 90% by volume, more preferably 10% to 70% by volume.

The particle size of the ceramic powders used for forming the matrix of the composite material is preferably 10 μm or less, to improve adhesion to the fibers.

In the fiber reinforced composite material of the present invention, optionally a binder may be used, as shown below.

A binder for densifying a sintered body of ceramics may be a usual binder or densifying agent used for sintering carbides, nitrides, etc. For example, boron, aluminum, iron, carbon and silicon, silicon nitride, etc. can be mentioned as a binder for silicon carbide; boron, borates, boron oxide, silicon nitride, aluminum phosphate, silicate glass, etc. can be mentioned as a binder for boron nitride; magnesium oxide, aluminum oxide, indium oxide, etc. can be mentioned as a binder for silicon nitride; and paraphine, yttrium oxide, etc. can be mentioned as a binder for aluminum nitride.

A binder for increasing the adhesivity between the fibers and the matrix of a ceramic can be, for example, at least one selected from organic silicone polymers such as diphenyl siloxane, dimethyl siloxane, polyborodiphenyl siloxane, polyborodimethyl siloxane, polycarbosilane, polydimethylsilane, polytitanocarbosilane, polyzirconocarbosilane, diphenylsilanediol, hexamethyldisilane, etc.

The binder for increasing the adhesivity between the ceramic powders and the inorganic fibers is converted, by heating, to $Si_3N_4$, SiC, $Si_2N_2O$, SiO, $SiO_2$, etc. which reacts with the surfaces of the ceramics powders and forms further a carbide, a nitride or an oxide, thereby increasing the adhesivity between the ceramics powders and inorganic fibers. The organic silicon polymer also serves to densify a sintered body of a ceramic, and therefore, an addition thereof is advantageous when obtaining a high density and strength composite material.

The binder need not be added if a high adhesivity between the ceramics and the inorganic fibers can be obtained.

The silicon polymers are in the form of a solid, a liquid, or an intermediate thereof, which is used as is, or in a fused state, or as a viscous solution dissolved in a solvent such as benzene, toluene, xylene, hexane, ether, tetrahydrofuran, dioxane, chloroform, methylenechloride, petroleum ether, petroleum benzine, ligroin, DMSO, DMF, etc., for mixing with a matrix. Silicon polymers that can be produced relatively easily and do not have a loss of weight after heating can be used advantageously, and polysilazane is an example thereof.

The amount of the above binder is selected to obtain a desired effect, and preferably, is contained in an amount of 0.5% to 80% by weight based on the weight of the ceramics of the matrix. An addition of less than 5% does not provide a sufficient effect, and an addition of more than 80% may prevent a sintering and densification of the ceramic, resulting in a lower strength.

The fiber-reinforced ceramics composite material of the present invention can be produced by forming an assembly of the ceramic powders, the silicon polymers, and the inorganic fibers with, optionally, a binder, followed by a sintering process comprising a pressing step and a heating step.

The assembly can be obtained in various ways; for example, by embedding the fibers in matrix powders or a mixture of the matrix powders and a binder, by alternately arranging the fibers and the matrix powders or the mixture as above, or by first arranging the fibers and then filling the matrix powders or the mixture as above in the gaps of the arranged fibers, an assembly can be relatively easily obtained.

To sinter the assembly, the assembly obtained as above may be formed under a pressure of 50 kg/cm$^2$ to 5000 kg/cm$^2$ with a rubber press or a mold press and then fired in an oven at a temperature of 700° C. to 2500° C., or the assembly may be hot pressed at a temperature of 700° C. to 2500° C. while pressing at a pressure of 50 kg/cm$^2$ to 2000 kg/cm$^2$. The atmosphere for the sintering is selected from atmosphere of vacuum, ammonia, inert gas, or a combination thereof. Depending on the kind of matrix material, the above atmosphere may further contain at least one of an oxidizing gas, a carbonizing gas and hydrogen at a partial pressure of 10 mmHg or less, which does not prevent the sintering.

The thus obtained sintered body may be further subject to a series of treatments described below, at least once. Namely, the sintered body is immersed in a fused silicon polymer or in a solution of a silicon polymer in an organic solvent to impregnate the polymer in grain boundaries and pores of the sintered body, and then the impregnated sintered body is heat treated. This procedure makes the sintered body denser. The impregnated silicon polymer is converted to $Si_3N_4$, SiC, $Si_2N_2O$, SiO, $SiO_2$, or the like by heat treatment. These converted materials exist in the grain boundaries and pores, to decrease the pores and to form a strong bond in the ceramics matrix, thereby increasing the mechanical strength.

The silicon polymer or a solution thereof in an organic solvent may be coated on the surface of the sintered body to fill open pores and form a surface coating, followed by the above heat treatment. This may also increase the mechanical strength of the sintered body. The organic solvent is a solvent that can solve the silicon polymer and may be, for example, benzene, toluene, xylene, hexane, ether, tetrahydrofuran, dioxane, chloroform, methylene chloride, ligroin, petroleum ether, petroleum benzine, DMSO, DMF, etc. The solution used has a lower viscosity. The heat treatment is carried out at 800° C. to 2500° C. with an atmosphere of at least one selected from vacuum, inert gas and ammonia, optionally with an oxidizing gas, a carbonizing gas or hydrogen, at a partial pressure of 10 mmHg or less. These densifying process can be repeated if advantageous.

In a further embodiment of the present invention, the matrix of the fiber-reinforced composite material of the present invention may comprise a high molecular weight organic compound.

The high molecular weight organic compound used can be a resin or a rubber conventionally used in this kind of a fiber-reinforced organic compound complex material. Examples of the resin and rubber are given below.

Examples of Resin

Polyethylene, ethylene-vinyl acetate copolymer, ethylene-ethylacrylate copolymer, ethylene-acrylic acid copolymer, ionomer resin, polypropylene, polybutene-1, poly-4-methylbutene-1, butadiene resin, polystylene, acrylonitrile-stylene copolymer, acrylonitrilebutadiene-stylene copolymer, methylmethacrylate-stylene copolymer, methylmethacrylate-butadiene-stylene copolymer, stylene-anhydrousmaleic acid copolymer, poly-p-methylstylene copolymer, polyvinilchloride, vinylchloride-vinylacetate copolymer, vinylchlorideethylene copolymer, polyvinylidenechloride, polytetrafluoroethylene, tetrafluoroethylene-hexafluoroprop-ylene copolymer, tetrafluoroethylene-perfluoroalkylvinylether copolymer, tetrafluoroethylene-hexafluoropropyleneperfluoroalkylvinylether copolymer, ethylene-tetrafluoroethylene copolymer, polychlorotryfluoroethylene, ethylene-chlorotrifluoroethylene copolymer, polyvinylidene fluoride, polyvinyl fluoride, polyvinyl acetate, polyvinyl alcohol, polyvinyl formal, polyvinyl butylal, ethylene-vinylalcohol, copolymer, polymethyl methacrylic acid, polyacrylonitrile, polyamide including nylon-6, nylon-11, nylon-66 and nylon-610, polyoxymethylene, polyhenylene ether, polycarbonate, polyethylene terephthalate, polybutylene terephthalate, unsaturated polyester copolymer diallylphthalate resin, polyurethane copolymer, phenol resin, cresol resin, xylenol resin, urea resin, meramine resin, benzoguanamine resin, epoxy resin, cellulose nitrate, cellulose acetate, cellulose acetate propyonate, cellulose acetate butylate, ethyl cellulose, silicone resin, polypyromellitimide, polyamideimide, polyetherimide, polyaminobismaleinimide, polybismaleinimidetriazine, polysulphone, polyether sulphone, polyallylate, polyphenylene sulphide, polyetheretherketon, and poly-p-vinylphenol.

Example of Rubber

Natural rubber, synthetic isoprene rubber, butadiene rubber, stylenebutadiene rubber, acrylonitrile-butadiene rubber, ethylene-propylene rubber, butyl rubber, chloroprene rubber, polyoxide rubber, fluorine-contained rubber, acrylic rubber, silicone rubber, urethane rubber, chlorosulphonated polyethylene, chlorinated polyethylene, epichlorohydrin rubber, ethylene-acrylic rubber, ethylene vinyl acetate elastomer, and phosphatidine rubber.

The preferred high molecular weight organic compounds are epoxy reins, polyamide resins and polyimide resins.

Other inorganic or organic fibers may be used in addition to the inorganic silicon nitride-based fibers of the present invention. These inorganic fibers are as mentioned before, and may be aramide fibers, liquid crystal fibers, and polyethylene fibers.

The amount of reinforcing inorganic fibers used depends on the form of the fibers used, such as arranging structure, and the kind of the organic compound used, etc., but preferably is from 10% to 90% by volume, more preferably 25% to 70% by volume.

Auxiliary additives used in this kind of a composite material may be also used, including, for example, a stabilizer, filler, and colorant, etc.

The fabrication of a fiber-reinforced high molecular weight organic compound composite matrix can be carried out in any conventional way, such as a hand lay up method, vacuum packing method, press packing method, autoclave forming method, spray up forming method, cold press method, continuous lamination forming method, filament winding forming method, matched metal die method, preform press forming, mat press forming, prepreg cloth press forming, SMC forming, BMC forming, stamping forming methods, transfer forming method, injection molding method, centrifugal forming method, rotation forming method, rotation ramination forming method, and casting method, etc.

EXAMPLES

Example 1

A gas blowing pipe, a mechanical stirrer, and a Dewar condenser were mounted to a four-necked flask with a content of 10 l. The content of the flask was replaced with dry $N_2$ from which oxygen had been removed and degassed dry pyridine was charged in the flask and cooled by ice, and then 774 g of dichlorosilane was added to form an adduct ($SiH_2Cl_2 \cdot 2C_5H_5N$) in the form of a white solid. The reaction mixture was ice-cooled and stirred while 735 g of ammonia purified by passing through a sodium hydroxide-containing tube and an activated carbon-containing tube was flown therein, followed by heating to 100° C.

After the completion of the reaction, the reaction mixture was centrifuged and cleaned with dry pyridine, and then filtered under a nitrogen atmosphere to obtain 5100 ml of a filtrate. Then 0.249 g of resinous solid perhydropolysilazane was obtained by vacuum distillation of the solvent from 5 ml of the filtrate.

The number average molecular weight of the obtained polymer was 980, when measured by GPC (gel permeation chlomatography). Then 5000 ml of 5% pyridine solution of the obtained perhydropolysilazane was charged in a 10 l stainless steel autoclave, to which 100 g of ammonia was added and stirred at 80° C. for 3 hours to conduct a polycondensation reaction. The reaction product was allowed to cool and the gas was replaced with nitrogen. The thus modified perhydropolysilazane had a number average molecular weight of 2400 and a weight average molecular weight of 20000 (GPC method, polystylene standard).

The solution was added with 5000 ml of xylene and vacuum distilled at 60° C. by a rotar evaporator until the volume of the solution become 1000 ml. This procedure was repeated twice, and the resultant solution was found to contain 0.03% by weight of pyridine (by GPC method).

The solvent was further removed by a rotary evaporator, and the vacuum distillation was stopped when the solution exhibited a desired spinnability. The solution was then transferred to a degassing container of a dry spinning apparatus and used as a spinning solution. The spinning solution was placed and degassed at 60° C. for 2 hours and spun through nozzles having an aperture diameter of 0.1 mm, at 30° C. into a spinning cylinder having an atmosphere of air heated at 130° C., and wound up at a speed of 300 m/min to obtain fibers having a diameter of 7 $\mu$m.

The spun fibers were heated under a tension of 500 g/mm$^2$ from room temperature to 1400° C. in a nitrogen atmosphere at a rate of 180° C./hour, to obtain silicon nitride-based fibers.

These obtained inorganic silicon nitride-based fibers had a tensile strength of 290 to 450 kg/mm$^2$ (average 350 kg/mm$^2$) and a modulus of elasticity of 30 to 85 ton/mm$^2$ (average 45 ton/mm$^2$), and the following characteristics:

| Element-ratio[1] | |
| --- | --- |
| N/Si | 1.27 |
| C/Si | 0.058 |
| O/Si | 0.043 |
| H/Si | 0.15 |
| X-ray small angle scattering strength ratio[2] | |
| 1° | 1.2 |

| | |
|---|---|
| 0.5° | 1.8 |
| Crystallinity | |
| Microcrystal crystalite size | 48 nm |

Note
(1) By elemental analysis
(2) PSPC (position sensing proportional counter)-5 was connected to an X-ray analyzer RJ-200B type (Rigaku Denki K.K.). The tube voltage was 45 kV, the tube current was 95 mA, and the first and second slits had diameters of 0.2 mm and 0.15 mm respectively. The scattering intensity was determined by integrating for 1000 seconds at every 0.02°. The sample was in an amount of 18 mg. The scattering intensity ratio was determined by comparing the scattering intensities of the fibers at 1° and 0.5° with those of air, as "I (silicon nitride-based fibers)/I (air)".

The inorganic silicon nitride-based fibers were aligned by arranging the axis of the fibers in one direction, impregnated with epoxy resin (sold bisphenol A) sufficiently degassed at about 40° C., and preliminarily cured at about 95° C. to obtain prepreg sheets. These sheets were laminated, were pressed under a pressure of 30 kg/cm$^2$ to remove the excess resin, and then cured at 170° C. for 4 hours. The thus obtained composite contained 60% by volume of the fibers.

The composite had a tensile strength of 158 kg/mm$^2$, a modulus of elasticity of 16.3 ton/mm$^2$, a shearing strength of 13.5 kg/mm$^2$, and a resistivity of $10^{15}$ Ω·cm.

Note that the same methods of analysis and measurements as above were used in the following Examples.

Example 2

First, 5000 ml of the pyridine solution of the perhydropolysilazane prepared in Example 1 were charged in a pressure resistant reactor having an inner volume of 10 l and the reaction was continued with stirring under a closed nitrogen atmosphere at 120° C. for 3 hours. During the reaction, a large amount of gas was generated to increase the pressure by 2.0 kg/cm$^2$. The reaction mixture was allowed to cool to room temperature and the gas was replaced with nitrogen. The thus modified perhydropolysilazane had a number average molecular weight of 1950. To the solution, 900 ml of ethyl benzene was added and the solvent was vacuum distilled at 70° C. to obtain white powders.

Toluene was gradually added to the white powders to dissolve the powders in the toluene and stopped when the solution exhibited a desired spinnability. The solution was then transferred to a degassing container of a spinning apparatus and degassed at 60° C. for about 4 hours The solution at 40° C. was then spun through nozzles having an aperture diameter of 0.08 mm into a spinning cylinder having an inside atmosphere of argon at 100° C. and wound up at a speed of 1000 m/min to obtain fibers having an average fiber diameter of 10 μm. The spun fibers were heated under a tension of 500 g/mm$^2$ in an ammonia atmosphere to 400° C., at an heating rate of 200° C./h, and to 1300° C. at an heating rate of 200° C./h, to obtain silicon nitride fibers.

The fibers had the following characteristics:

| Element ratio | |
|---|---|
| N/Si | 0.902 |
| C/Si | 0.013 |
| O/Si | 0.060 |
| X-ray small angle scattering intensity ratio | |
| 1° | 8.7 |
| 0.5° | 11.4 |
| Crystallinity | |
| Amorphous | |

Using these fibers, a composite was prepared in the same manner as in Example 1. The composite contained 60% by volume of the silicon nitride fibers.

The characteristics of the composite were evaluated in the same manner as in Example 1, and the results are shown in Table 1.

Example 3

To a four necked flask having an inner volume of 5 l, were mounted a gas blowing pipe, a mechanical stirrer, and a Dewer condenser. The inside of the reaction system was replaced with dry nitrogen from which oxygen had been removed, followed by charging 3000 ml of dry degassed pyridine into the four necked flask, which was cooled with ice. Then 902.5 g of dichlorosilane was added to form an adduct (SiH$_2$Cl$_2$·2C$_5$H$_5$N) in the form of a white solid. While ice-cooling and stirring the reaction mixture, 255.5 g of ammonia purified by passage through a sodium hydroxide-containing tube and an activated carbon-containing tube was mixed with nitrogen gas and blown into the reaction mixture After the completion of the reaction, the reaction mixture was centrifuged and cleaned with dry methylene chloride, followed by filtering under nitrogen atmosphere to obtain 4700 ml of a filtrate.

To 4000 ml of the filtrate containing perhydropolysilazane, was added 365.0 mg of polyethylene oxide (molecular weight $5 \times 10^6$), and the whole vigorously stirred for 1 hour. Then the solvent was removed by vacuum distillation to obtain a spinning solution of 30 wt % perhydropolysilazane in pyridine. The spinning solution was filtered and degassed and then spun by a dry spinning method under a nitrogen atmosphere to obtain white fibers. The white fibers were dried under vacuum at 50° C. for 4 hours and heated under a nitrogen atmosphere at 100° C. for 3 hours, under an ammonia atmosphere at 900° C. for 1 hour, and then under a nitrogen atmosphere at 1050° C. for 5 hours, to obtain inorganic silicon nitride-based fibers.

It was confirmed by X-ray diffraction that the obtained fibers were of amorphous silicon nitride, and had a diameter of 10 μm to 20 μm, a tensile strength of 90 kg/mm$^2$ to 350 kg/mm$^2$, a modulus of elasticity of 9 ton/mm$^2$ to 30 ton/mm$^2$ and a resistivity of $3 \times 10^{12}$ to $7 \times 10^{12}$ Ωcm.

The inorganic silicon nitride fibers had the following characteristics.

| Element ratio | |
|---|---|
| N/Si | 1.12 |
| C/Si | 0.008 |
| O/Si | 0.07 |
| X-ray small angle scattering intensity ratio | |
| 1° | 6.8 |
| 0.5° | 10.8 |
| Crystallinity | |
| Amorphous | |

Using these silicon nitride fibers, a composite was prepared in the same manner as in Example 1. The composite contained 60% by volume of the silicon nitride fibers. The properties of the composite were evaluated in the same manners as in Example 1, and the results are shown in Table 1.

Comparative Examples 1 and 2

The procedures of Example 1 were repeated except that the inorganic fibers used were commercially obtained carbon fibers (Comparative Example 1) and commercially obtained silicon carbide fibers (Comparative Example 2), instead of the silicon nitride-based fibers. The contents of the fibers in these composites were 60% by volume.

The results of the evaluation of these composites are shown in Table 1.

TABLE 1

|  |  | Example | | | Comparative Example | |
|---|---|---|---|---|---|---|
|  |  | 1 | 2 | 3 | 1 | 2 |
| Element ratio | N/Si | 1.27 | 0.902 | 1.12 |  |  |
|  | C/Si | 0.058 | 0.013 | 0.008 |  | 1.25 |
|  | O/Si | 0.043 | 0.060 | 0.07 |  | 0.44 |
|  | H/Si | 0.15 | 0.08 | 0.07 |  |  |
| X-ray small angle scattering | 1° | 1.2 | 8.7 | 6.8 | 70 | 14.3 |
| intensity ratio | 0.5° | 1.8 | 11.4 | 10.5 | 100 | 7.2 |
| Tensile strength of fiber | $(kg/mm^2)^{(1)}$ | 270 | 300 | 250 | 278 | 250 |
| Modulus of elasticity of fiber | $(ton/mm^2)^{(1)}$ | 28 | 39 | 20 | 27 | 20 |
| Tensile strength of composite | $(kg/mm^2)^{(1)}$ | 158 | 176 | 147 | 108 | 120 |
| Modulus of elasticity of composite | $(ton/mm^2)^{(1)}$ | 16.3 | 23.0 | 11.8 | 10.0 | 11.1 |
| Shearing strength of composite | $(kg/mm^2)^{(2)}$ | 13.5 | 14.1 | 13.8 | 5.7 | 10.7 |
| Resistivity | $(\Omega \cdot cm)^{(3)}$ | $10^{15}$ | $10^{15}$ | $10^{15}$ | $3.7 \times 10^{-3}$ | $10^4$ |
| Matrix |  | Epoxy resin | Epoxy resin | Epoxy resin | Epoxy resin Nylon-6,6 | Epoxy resin |
| Content of fiber | (vol. %) | 60 | 60 | 60 | 60 | 60 |

(1) measured based on JIS K-7113
(2) measured based on JIS K-7111
(3) measured based on JIS K-6911

As seen in Table 1, the composites reinforced with the silicon nitride-based fibers of Examples 1 to 3 according to the present invention had superior mechanical strengths including tensile strength, modulus of elasticity and shearing strength, in comparison with the composite reinforced with the carbon fibers and the silicon carbide fibers of Comparative Examples 1 and 2. Particularly, the difference of the shearing strength between the above two groups is remarkable, which means that the adhesivity of the silicon nitride-based fibers used in Examples 1 to 3 to the matrix is superior to that of the carbon or silicon carbide fibers The resistivities of the composites of Examples 1 to 3 are remarkably larger than those of Comparative Examples 1 and 2, which makes the composite of the present invention very useful as a light weight insulating material having an excellent strength and modulus.

Example 4

On a pure aluminum foil (1070) having a thickness of 0.5 mm, the silicon nitride-based fibers obtained in Example 1 were aligned in one direction and covered with another aluminum foil, and then passed between hot rolls at 670° C. to form a composite foil comprising the fibers and the aluminum foils, 27 of these composite foil were laminated and placed under vacuum at 670° C. for 10 minutes, and then hot pressed at 600° C. to obtain a silicon nitride-based fiber-reinforced aluminum composite. This composite contained the fibers in an amount of 30% by volume.

The composite had a tensile strength of 75 kg/mm² and a modulus of elasticity of 11 ton/mm². The high tensile strength and high modulus of elasticity of the composite are due to the remarkable composite effects of the particular silicon nitride-based fibers used. This was also confirmed by scanning electron microscopy of a section of the composite, in that the inorganic fibers were in contact with or close to the matrix metal and reaction products did not exist at the interface therebetween.

Comparative Example 3

The procedures of Example 4 were repeated, using commercially available silicon carbide fibers having the following characteristics instead of the silicon nitride-based fibers, to fabricate a silicon carbide fiber-reinforced composite.

| Silicon carbide fibers | |
|---|---|
| Element ratio | |
| C/Si | 1.25 |
| O/Si | 0.44 |
| H/Si | — |
| X-ray small angle scattering intensity ratio | |
| 1° | 14 |
| 0.5° | 7 |

The composite contained 30% by volume of the fibers. The obtained composite had a tensile strength of 36 kg/mm² and a modulus of elasticity of 6.9 ton/mm², which are remarkably lower than those of Example 4. This is due to a decrease of the strength of the silicon carbide fibers to about 30% of the original strength when placed in a fused aluminum bath at 670° C. for 10 minutes.

Example 5

The silicon nitride-based fibers obtained in Example 2 were aligned in one direction and titanium metal was coated thereon at a thickness of 0.1 μm to 10 μm by flame spraying. These aligned and coated fibers were laminated, with titanium metal powders inserted therebetween and then pressed. The pressed body was preliminarily fired in a hydrogen gas atmosphere at 520° C. for 3 hours and then hot pressed in an argon atmosphere at 1150° C. under a pressure of 200 kg/cm², to obtain a silicon nitride-based fiber-reinforced titanium composite.

The composite contained 45% by volume of the silicon nitride-based fibers and had a tensile strength of 165 km/mm², which is about 2.8 times higher tan that of titanium.

Example 6

The silicon nitride-based fibers obtained in Example 3 were cut into chips having a length of 1 mm and added and mixed with magnesium alloy powders made of 3% aluminum, 1% manganese, 1.3% zinc and the remainder magnesium. The mixture was packed in a stainless steel mold 70×50×10 mm and kept in an argon atmosphere at a temperature of 490° C. under a pressure of 200 kg/cm² for 1 hour to form a shape. Finally, the stainless foil was peeled off and the surface of the shape was polished, whereby a composite was obtained.

The composite contained 30% by volume of the chopped fibers and had a tensile strength of 52 kg/mm².

Comparative Example 4

The procedures of Example 5 were repeated but commercially available silicon carbide fibers were used instead of the silicon nitride-based fibers, to obtain a silicon carbide fiber-reinforced titanium composite.

The thus obtained composite had a tensile strength of 112 kg/cm² and a modulus of elasticity of 17 ton/mm², which are lower than those of Example 5.

Comparative Example 5

The procedures of Example 6 were repeated but commercially available silicon carbide fibers were used instead of the silicon nitride-based fibers, to obtain a silicon carbide fiber-reinforced magnesium alloy composite.

The thus obtained composite had a tensile strength of 29 kg/mm², which is inferior to that of Example 6.

Examples 7 to 8 and Comparative Example 6

Silicon nitride-based fibers were fabricated in the same manners as those of the preceding Examples, but were modified. The obtained fibers had the element ratios and X-ray small angle scattering intensity ratios as shown in Table 2. These fibers were used in the same manner as in Example 4 to fabricate silicon nitride-based fiber-reinforced composite.

This composite had the tensile strength and modulus of elasticity shown in Table 2.

fibers The laminate was pressed by dies under a pressure of 500 kg/cm², and the pressed laminate was heated in a nitrogen atmosphere to 1550° C. at an elevation rate of 200° C./hour, and kept at that temperature for 1 hour to obtain silicon nitride-based fiber-reinforced silicon nitride-based composite.

The obtained composite had a breaking strengths at a direction normal to the fibers at room temperature and at 1300° C. of 123 kg/mm² and 70 kg/mm², respectively.

Comparative Example 7

The procedures of Example 9 were repeated using commercially available silicon carbide fibers instead of the silicon nitride-based fibers and silicon carbide fiber-reinforced silicon nitride-based composite was fabricated.

The breaking strengths of the composite at room temperature and at 1300° C. were 80 kg/mm² and 32 kg/mm² respectively.

Comparative Example 8

The procedures of Example 9 were repeated but the silicon nitride-based fibers and the polysilazane powders were not added and a sintered body of α-type silicon nitride was fabricated.

The breaking strengths of the sintered body at room temperature and at 1300° C. were 42 kg/mm² and 17 kg/mm² respectively.

Example 10

β-type silicon carbide powders having an average particle size of 0.2 μm were added with 3% by weight of boron carbide and 5% by weight of polysilazane powders The silicon nitride-based fibers fabricated in Example 2 and having a length of 50 mm were aligned in one direction and laminated together with the above powder mixture, in which the content of the fibers was 10% by volume and the aligned fibers were arranged in two directions having an angle deference of 90°. The laminate was then hot pressed at 1750° C. under 300 kg/cm² for 30 minutes to obtain a silicon nitride-based fiber-reinforced silicon carbide sintered composite

TABLE 2

|  |  | Example | | | | | Comparative Example | | | |
|---|---|---|---|---|---|---|---|---|---|---|
|  |  | 4 | 5 | 6 | 7 | 8 | 3 | 4 | 5 | 6 |
| Element ratio | N/Si | 1.30 | 0.902 | 1.12 | 0.21 | 0.972 | 0 | 0 | 0 | 1.24 |
|  | C/Si | 0.058 | 0.013 | 0.008 | 0.040 | 0.018 | 1.25 | 1.25 | 1.25 | 0.044 |
|  | O/Si | 0.043 | 0.060 | 0.07 | 0.182 | 0.062 | 0.44 | 0.44 | 0.44 | 0.035 |
|  | H/Si | 0.15 | 0.08 | 0.07 | 0.07 | 0.08 | — | — | — | 0.07 |
| X-ray small angle scattering | 1° | 6.5 | 8.7 | 6.8 | 2.5 | 3.7 | 14.3 | 14.3 | 14.3 | 35 |
| intensity ratio | 0.5° | 10.5 | 11.4 | 10.5 | 3.6 | 5.5 | 7.2 | 7.2 | 7.2 | 39 |
| Tensile strength of fiber | (kg/mm²) | 270 | 300 | 250 | 265 | 255 | 250 | 250 | 250 | 140 |
| Modulus of elasticity of fiber | (ton/mm²) | 28 | 39 | 20 | 26 | 23 | 20 | 20 | 20 | 18 |
| Tensile strength of composite | (kg/mm²) | 75 | 165 | 44 | 73 | 68 | 36 | 112 | 29 | 41 |
| Modulus of elasticity of composite | (ton/mm²) | 11 | 37 | 7.9 | 10 | 9.7 | 6.9 | 17 | 5.2 | 8.8 |
| Matrix |  | Al | Ti | Mg alloy | Al | Al | Ti | Mg alloy | Al | Al |

Example 9

α-type silicon nitride powders having an average particle size of 0.5 μm was mixed with 2% by weight of Al₂O₃, 3% by weight of Y₂O₃, 3% by weight of AlN and 10% by weight of polysilazane. The inorganic silicon nitride-based fibers fabricated in Example 1 and having a length of 50 mm were aligned in one direction, and were laminated together with the above powder mixtures The laminate contained 46% by volume of the The breaking strengths of the composite were 61 kg/mm² and 59 kg/mm² respectively.

Example 11

A mixture of AlN powders having an average particle size of 0.2 μm and 10% by weight of CaO was added with 15% by weight of a xylene solution of polysilazane (polysilazane/xylene weight ratio of 1) and the xylene was evaporated to form flakes which were passed through a 325 mesh screen to obtain particles of the mixture having a uniform size A plain of the silicon nitride-based fibers fabricated in Example 3 (weave, six warps/cm, six wefts/cm, 5000 yarns) was laminated alternately with the above particles of the mixture The laminate was hot pressed at 1800° C. under 200 kg/cm$^2$ for 1 hour to obtain a silicon nitride-based fiber-reinforced AlN sintered composite The sintered composite had a breaking strength at room temperature of 42 kg/mm$^2$, which is about 70% better than the breaking strength of a sintered AlN at room temperature of 30 kg/mm$^2$.

Example 12

The silicon nitride-based fiber-reinforced silicon nitride sintered composite fabricated in Example 9 was immersed under a vacuum of about $1 \times 10^{-1}$ mmHg in a solution of 1 part by weight of polysilazane in 0.3 part by weight of xylene, and then a pressure of 100 kg/cm$^2$ was applied thereto. The impregnated sintered composite was heat treated in a nitrogen atmosphere at 1550° C. for 1 hour. This operation was repeated three times The apparent density of the obtained sintered composite was increased from 2.94 g/cm$^3$ before the impregnation to 3.12 g/cm$^3$ and had an improved breaking strength at room temperature of 140 kg/mm$^2$.

Comparative Example 9

The procedures of Example 10 were repeated but the silicon nitride-based fibers and the polysilazane powders were not used, and a sintered body of silicon carbide was obtained.

The breaking strengths of the sintered body at room temperature and at 1400° C. were 24 kg/mm$^2$ and 18 kg/mm$^2$ respectively.

Comparative Examples 10 to 12

The procedures of Example 9 were repeated but the silicon nitride-based fibers used had a N/Si of less than 0.3 and excess X-ray small angle scattering intensity ratio at 1° and 0.5° of 35 and 39 (Comparative Examples 10 and 11). Other silicon nitride-based fibers used had an N/Si of more than 3 (Comparative Example 12), but in this case, spinning could not be carried out smoothly.

We claim:

1. An amorphous inorganic silicon nitride-based fiber composed of silicon, nitrogen and carbon, optionally with oxygen and hydrogen, and having atomic ratio between above respective elements of N/Si=0.3 to 3, O/Si=up to 15, C/Si=up to 7 and H/Si=up to 15, wherein ratios of X-ray scattering intensity thereof to that of air at 1° and 0.5° are from 1 to 10 respectively and the silicon nitride-based fiber is still amorphous after heating in an inactive atmosphere at 1200° C. for 1 hour.

2. A fiber according to claim 1, wherein the atomic ratios are N/Si=0.6 to 1.4, O/Si=up to 10, C/Si=up to 3.5 and H/S=up to 5.

3. A fiber according to claim 2, wherein the atomic ratios are N/Si=1 to 1.3, O/Si=up to 4, C/Si =up to 3.5 and H/Si=up to 1.

4. A fiber according to claim 1, wherein the ratios of the X-ray scattering intensity at 1° and 0.5° are from 1 to 5.

5. A fiber according to claim 1, containing microcrystals in the amorphous fiber.

6. A fiber according to claim 1, having a tensile strength of 100 kg/mm$^2$ to 450 kg/mm$^2$.

7. A fiber according to claim 1, having a fiber diameter of 3 μm to 50 μm.

8. A fiber according to claim 1, having a modulus of elasticity of 10 to 60 ton/mm$^2$.

9. An amorphous inorganic silicon nitride-based fiber composed of silicon, nitrogen and carbon, optionally with oxygen and hydrogen and having an atomic ratio between above respective elements of N/Si=0.3 to 3, O/Si=up to 15, C/Si=p to 7 and H/Si=up to 15, and obtained by heating a polysilazane fiber at a temperature elevation rate of not more than 20° C./min in a temperature range of 300° to 600° C., pretreating the polysilazane fiber with ammonia in a temperature range of not more than 600° C., and heating the polysilazane fiber to convert said fiber to an inorganic silicon nitride-based fiber, wherein ratios of X-ray scattering intensity thereof to that of air at 1° and 0.5° are from 1 to 10 respectively and the silicon nitride-based fiber is still amorphous after heating in an inactive atmosphere at 1200° C. for 1 hour.

* * * * *

TABLE 3

| | | Example | | | | | | Comparative Example | | | | | |
|---|---|---|---|---|---|---|---|---|---|---|---|---|---|
| | | 9 | 10 | 11 | 12 | 13 | 14 | 7 | 8 | 9 | 10 | 11 | 12 |
| Element ratio | N/Si | 1.80 | 0.902 | 0.486 | 1.02 | 0.96 | 1.27 | 0 | — | — | 0.29 | 1.24 | 3.5 |
| | C/Si | 0.058 | 0.013 | 0.629 | 0.64 | 0.31 | 0.058 | 1.25 | — | — | 0.014 | 0.044 | — |
| | O/Si | 0.043 | 0.060 | 0.479 | 0.35 | 0.22 | 0.043 | 0.44 | — | — | 1.41 | 0.035 | — |
| | H/Si | 0.15 | 0.08 | — | 0.07 | 0.07 | 0.15 | — | — | — | 0.05 | 0.07 | — |
| | M/Si | — | — | — | 0.09 | 0.02 | — | — | — | — | — | — | — |
| X-ray small angle scattering ratio | 1° | 1.2 | 8.7 | 6.8 | 7.5 | 9.3 | 1.2 | 14.3 | — | — | 12.5 | 35 | — |
| | 0.5° | 1.8 | 11.4 | 10.5 | 6.2 | 7.0 | 1.8 | 7.2 | — | — | 15.5 | 39 | — |
| Breaking strength at room temp. | (kg/mm$^2$) | 123 | 61 | 42 | 18.7 | — | 140 | 80 | 42 | 24 | 85 | 92 | — |
| Breaking strength at high temp. | (kg/mm$^2$) | 70 (1300° C.) | 50 (1400° C.) | — | — | — | — | 32 (1300° C.) | 17 (1300° C.) | 18 (1400° C.) | 35 (1300° C.) | 46 (1300° C.) | — |
| Matrix | | Si$_3$N$_4$ | SiC N/Si | AlN Small N/Si | Glass Alumina fiber | Al$_2$O$_3$ Titanium fiber | Si$_3$N$_4$ Impregnation | Si$_3$N$_4$ SiC fiber | Si$_3$N$_4$ Fiber | SiC No fiber | Si$_3$N$_4$ N/Si <0.3 | Si$_3$N$_4$ Small angle scattering >20 | Si$_3$N$_4$ Cannot be spun. |
| Add. Note | | | | | | | | | | | | | |